United States Patent [19]

Hall, Jr. et al.

[11] Patent Number: 4,710,593
[45] Date of Patent: Dec. 1, 1987

[54] GEOPHONE CABLE SPLICE AND METHOD

[75] Inventors: Ernest M. Hall, Jr., Houston; Jeffrey A. Buis, Sugar Land, both of Tex.

[73] Assignee: Oyo Corporation, Houston, Tex.

[21] Appl. No.: 885,558

[22] Filed: Jul. 14, 1986

[51] Int. Cl.$^4$ ............................................. H02G 15/18
[52] U.S. Cl. .................................... 174/88 R; 29/868; 174/70 S; 337/191; 439/638
[58] Field of Search .................. 174/705, 88 R, 84 R; 337/191; 29/868, 869; 339/151 C

[56] References Cited

U.S. PATENT DOCUMENTS

| 2,727,120 | 12/1955 | Boggs | 156/49 |
|---|---|---|---|
| 3,158,680 | 11/1964 | Lovitt et al. | 174/88 R |
| 3,502,790 | 3/1970 | Cain et al. | 174/77 R |
| 3,612,746 | 10/1971 | Sankey | 174/73 R |
| 3,749,816 | 7/1973 | Shaw | 174/70 S X |
| 3,770,876 | 11/1973 | Post | 174/88 R |
| 3,925,596 | 12/1975 | Siden | 174/88 R |
| 4,501,927 | 2/1985 | Sievert | 156/49 X |

FOREIGN PATENT DOCUMENTS 1068784 11/1959 Fed. Rep. of Germany .... 174/88 R

Primary Examiner—Morris H. Nimmo
Attorney, Agent, or Firm—Fulbright & Jaworski

[57] ABSTRACT

A method and apparatus of making a splice in a geophone cable for providing a weatherproof cable splice with maximum cable break strength. The ends of each of the cables are soldered to a printed circuit board to provided the necessary cable strength. The printed circuit board is covered by a silicone rubber boot which sealingly engages the ends of each of the cables on either side of the printed circuit board to insure moisture protection.

11 Claims, 3 Drawing Figures 4,710,593

GEOPHONE CABLE SPLICE AND METHOD

BACKGROUND OF THE INVENTION

It is desirable to be able to make inline geophone cable splices. Such cable splices need to be sturdy as the cable and its connected equipment is used and reused in rough terrain and under rough handling conditions. Furthermore, such splices are required to be waterproof as the geophone strings are frequently laid in wet and marshy locations. Various types of splicing equipment presently used are complicated, expensive, some require potting, some are not easily field serviceable, and most require considerable time for installation.

The present invention is directed to an inline geophone cable splice which is field serviceable, waterproof, provides maximum cable break strength while providing a cost efficient and rapid method of repair. The present geophone cable splice does not require any internal potting, is quick and easy to install, is flexible, and is a smaller size and weight than conventional splicing apparatus.

SUMMARY

The present invention is directed to a geophone cable splice which includes a printed circuit board having at least two spaced apart electrically conductive lands bonded to an electrical nonconductive base. First and second cables each of which includes at least first and second electrical conductors are joined to the printed circuit board by soldering to provide high cable strength. The first conductors of each cable are soldered to one of the electrical lands and the second conductors are soldered to another electrical land. A resilient boot having an opening therethrough is installed around the printed circuit board to insure moisture protection. The boot opening encloses the printed circuit board and each end of the boot sealingly engages one of the cables.

Still a further object of the present invention is wherein the ends of the boot have an opening of a normal size of less than the outside circumference of the cables for providing a waterproof seal.

Still a further object of the present invention is where the boot is made of a liquid injected molded silicone rubber which provides a flexible splice along with moisture protection.

Still a further object of the present invention is where the number of electrical conductors to be spliced are no more than four which provides a size which allows the boot to be slidably installed over the printed circuit board and onto the conductors and seal against the conductors while being able to accomodate and move over the printed circuit board.

Yet a still further object of the present invention is wherein the length of the solder connection of the conductors to the lands are approximately one-fourth of an inch for providing maximum cable break strength.

Still a further object of the present invention is the method of splicing two geophone cables together, each of which has an outer jacket and at least first and second insulation covered electrical conductors. The method includes stripping the outer jackets of the ends of the cables to be spliced, and stripping the insulated covers from the ends of the electric conductors, soldering the first stripped conductors to a conductive land which is bonded to an electrically nonconductive base and soldering the second strip conductors to a second conductive land which is bonded to the base. The method further includes sliding a resilient boot having an opening therethrough over the cables and the printed circuit board with a lubricant in which the ends of the opening have a normal size of less than the outside circumference of the cables. The method further includes wherein the boot is slid on one of the cables prior to soldering that cable to the printed circuit board and wherein the outer jacket of the one cable is stripped back a distance greater than the length of the boot for allowing the one cable to pulled through the boot and then the conductors of the one cable are cut short prior to soldering them to the lands.

The method further includes wherein the conductors are soldered to the lands with a length sufficient to provide maximum mechanical strength. The method further comprehends using a boot of liquid moldable silicone rubber and the lubricant is a silicone lubricant.

Other and further objects, features and advantages will be apparent from the following description of a presently preferred embodiment of the invention, given for the purpose of disclosure, and taken in conjunction with the accompanying drawing.

DESCRIPTION OF THE PREFERRED EMBODIMENT

Figure 1:
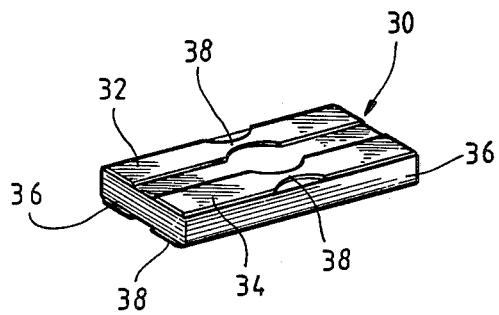
FIG. 1 is a perspective view of a printed circuit board used for making the high strength splice connection between two geophone cables of the present invention.

For purposes of illustration only, various sizes and dimensions will be given for purposes of illustration as an aid to understanding the present invention. However, it is to be understood that such sizes and dimensions are exemplary.

Referring now to the drawing, it is desired to join two geophone cables 10 and 12 together by a splice which will not only provide a maximum splice strength, but which is waterproof and field serviceable. For example, the cables 10 and 12 may be conventional 22 gauge four conductor cable with each conductor having 19 strands. The present splice is useful for joining any number of conductors up to four. Thus, the cable 10 includes conductors 14, 16, 18, and 20. Similarly, the cable 12 includes conductors 22, 24, 26, and 28.

A printed circuit board (PCB) 30 is provided to accommodate up to four conductors for each of the cables 10 and 12 and to provide a high strength connection. The PCB 30 includes up to four lands such as lands 32, 34, 36, and 38, all of which are spaced from each other and which are bonded to an electrical nonconductive or dielectric base 36. Preferably each of the lands includes a reduced middle portion 38 which while sufficient for conducting current between connected conductors reduces the heat transfer from one end of the lands to the other end of the lands while soldering. The PCB 30 is conventional and is commercially available as Model FR4-2 from Circuit Boards of America. The PCB not only has the advantage of providing an electrical interconnection between conductors to be spliced, but is extremely rugged and of sufficient tensile strength to maintain the necessary capability of the splice to withstand the normal stresses to which it is subjected.

In making the splice, the outer jacket 40 of the cable 10 is stripped away at its end to approximately 7/16th inch length exposing the connectors 14, 16, 18, and 20. Next, the insulation from these connectors 14, 16, 18, and 20 are stripped back from their ends approximately ¼th of an inch in length to expose the bare conductors such as 14a and 18a. Preferably, the bare conductors are tinned to hold the multistrands in place and to prepare the bare conductors for soldering.

The outer jacket 42 of the end of the second cable 12 is then stripped back approximately 4 inches exposing the insulated conductors 22, 24, 26 and 28. A resilient and waterproofing boot 50 is provided having an opening therethrough which may include an enlarged cavity 52 as a nest for PCB 30, and ends 54 and 56. Preferably, the boot 50 is made out of a liquid moldable silicone rubber in which the ends 54 and 56 are sized to have a normal opening size of less, such as 0.015 inches less in diameter, than the outside diameter of the cables 10 and 12 for waterproofing the cable splice. The length of the boot 50 is approximately 3 inches. It is preferable at this time to install the boot 50 on the cable 12. While it would normally be difficult to install the undersized ends 54 and 56 of the boot 50 on the cable 12, the conductors 22, 24, 26 and 28 which are now exposed without an outer jacket 42 and are of a length greater than the length of boot 50 may be inserted through the opening in the boot 50. With the use of a silicone spray lubricant on the inside of the boot 50 and on the outside of the cable 12, the cable 12 may be pulled through the interior of the boot 50 until approximately ⅛th of an inch of the outer jacket 42 protrudes through the boot 50.

At this time, the conductors 22, 24, 26, and 28 are prepared for soldering similar to the conductors 14, 16, 18, and 20 by cutting the conductors 22, 24, 26, and 28 to approximately 7/16th of an inch in length and stripping the insulation therefrom to provide bare conductors of approximately ¼ inch in length.

Figure 2:
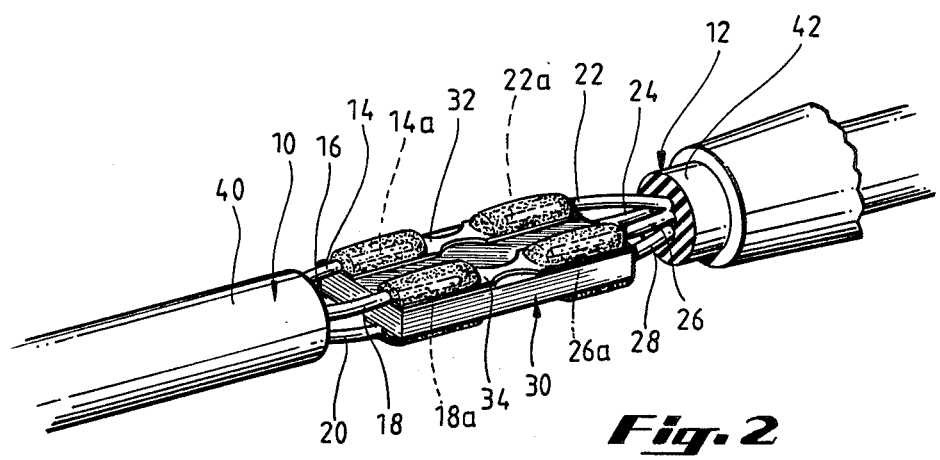
FIG. 2 is a perspective view of the two cables soldered to the printed circuit board prior to sliding the waterproof boot in place.
Figure 3:
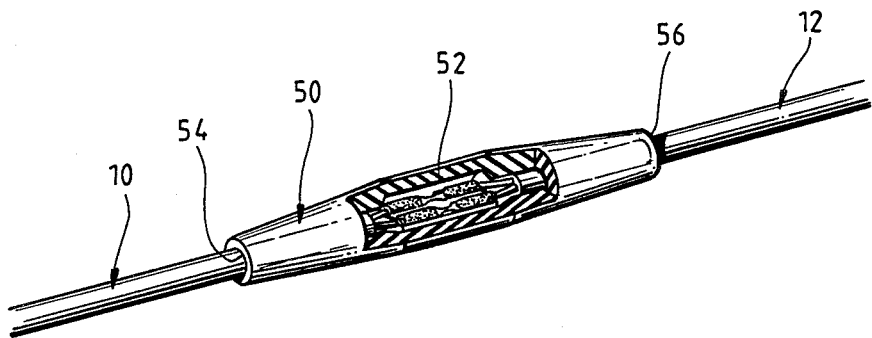
FIG. 3 is a perspective view, partly in cross section, of the finished splice with the boot enclosing the splice and sealing against the ends of the spliced cable.

At this time, the bare conductors 14a, 18a, 22a and 26a are then soldered to the lands 32 and 34 as shown in FIG. 2. That is, conductors 14a and 22a are soldered to opposite ends of land 32 thereby making a splice between conductors 14 and 22. Similarly, bare conductors 18a and 26a are soldered to opposite ends of land 34 thereby making a connection between the conductors 18 and 26. It is desirable to add solder along both sides of the stripped conductors 14a, 18a, 22a and 26a to provide a filet along both sides of the stripped wire. In addition, it is desirable that the solder extend a length of approximately ⅛th of an inch to make a large area contact between the conductors and the lands for providing maximum strength of the connection.

After soldering the bare conductors to the lands on the top of the PCB 30, the PCB 30 is inverted and same soldering operations are performed for any additional conductors such as 16, 20, 24, and 28.

After completing the soldering of the conductors to the PCB 30, the PCB 30 and the cable 10 is sprayed with the silicone spray and the boot 50 is slid over the PCB to position the PCB 30 within the cavity 52 if one is used or at the mid-point between ends 54 and 56 which sealingly engage the cables 10 and 12, respectively. The PCB 30 is sized to slide through an end 54 for allowing the boot 50 to move over the PCB 30.

In actual tests, the splice created as described above had a strength of approximately 90% of the maximum cable break strength and the splice withstood conventional moisture tests.

The method of splicing two geophone cables together each of which has an outer jacket and at least first and second insulated covered electrical conductors is apparent from the foregoing description. The method, however, comprises stripping the outer jackets of the ends of the cables to be spliced, stripping the insulated covers from ends of the electrical conductors, soldering the first stripped conductors to a conductive land which is bonded to an electrically nonconductive base of a printed circuit board, soldering the second stripped conductors to a second conductive land which is bonded to the base, sliding a resilient boot having an opening therethrough over the cables and the printed circuit board with a lubricant in which the ends of the opening have a normal size less than the outside circumference of the cables. The method further comprehends wherein the boot is slid on one of the cables prior to soldering that cable to the printed circuit board. The method further comprehends wherein the outer jacket of the one cable is stripped back a distance greater than the length of the boot for allowing the one cable to be pulled through the boot by the conductors and the conductors of the one cable are then cut short prior to soldering them to the lands. The method further comprehends wherein the boot is of a liquid moldable silicone rubber and the lubricant is a silicone lubricant.

The present invention, therefore, is well adapted to carry out the objects and attain the ends and advantages mentioned as well as others inherent therein. While a presently preferred embodiment of the invention has been given for the purpose of disclosure, numerous changes in the details of construction, arrangement of parts, and steps of the process will be readily apparent to those skilled in the art and which are encompassed within the spirit of the invention and the scope of the appended claims.

What is claimed is:

1. A geophone cable splice comprising,
    a printed circuit board having at least two spaced apart electrical conductive lands bonded to an electrical nonconductive base,
    first and second round cables, each of said cables having at least first and second round electrical conductors said first conductors of each of said cables soldered to one of the electrical lands and said second conductors of each of said cables soldered to another electrical land, and
    a resilient boot having an opening therethrough, said opening enclosing the printed circuit board with one end of the boot sealingly engaging the first cable and the other end of the boot sealingly engaging the second cable.

2. The apparatus of claim 1 wherein the ends of the boot have an opening of normal size of less than the outside circumference of the cables for sealing thereon.

3. The apparatus of claim 1 wherein the boot includes an enlarged cavity in said opening and positioned between said ends.

4. The apparatus of claim 1 wherein the boot is of a liquid injection molded silicone rubber.

5. The apparatus of claim 1 wherein the number of electrical conductors to be spliced are no more than four.

6. The apparatus of claim 1 wherein the length of the solder connection of the conductors to the lands are approximately ⅛th of an inch for maximum cable break strength.

7. The method of splicing two round geophone cables together, each of which have an outer round jacket, and at least first and second insulation-covered round electrical conductors comprising,
- stripping the outer jackets of the ends of the cables to be spliced.
- stripping the insulated covers from the ends of the electrical conductors;
- soldering the first stripped conductors to a conductive land which is bonded to an electrically non-conductive base of a printed circuit board,
- soldering the second stripped conductors to a second conductive land which is bonded to be base of the printed circuit board, and
- sliding a resilient boot having an opening therethrough over the cables and the printed circuit board with a lubricant located between the boot and the cables in which the ends of the opening have a normal size of less than the outside circumference of the cables.

8. The method of claim 7 wherein the boot is slide on one of the cables prior to soldering that cable to the printed circuit board.

9. The method of claim 8 wherein the outer jacket of the one cable is stripped back a distance greater than the length of the boot for allowing the one cable to be pulled through the boot by the conductors, and the conductors of the one cable are cut short prior to soldering them to the lands.

10. The method of claim 7 wherein the conductors are soldered to the lands with a length of solder connection of approximately ⅛th of an inch.

11. The method of claim 7 wherein the boot is of liquid moldable silicone rubber and the lubricate is a silicone lubricant.

* * * * *